(12) United States Patent
Kikuchi et al.

(10) Patent No.: US 8,065,914 B2
(45) Date of Patent: Nov. 29, 2011

(54) VIBRATION GYRO

(75) Inventors: Takayuki Kikuchi, Minowa (JP); Norifumi Shimisu, Minami-Minowa (JP)

(73) Assignee: Seiko Epson Corporation (JP)

( * ) Notice: Subject to any disclaimer, the term of this patent is extended or adjusted under 35 U.S.C. 154(b) by 735 days.

(21) Appl. No.: 12/164,326

(22) Filed: Jun. 30, 2008

(65) Prior Publication Data

US 2009/0007664 A1 Jan. 8, 2009

(30) Foreign Application Priority Data

Jul. 6, 2007 (JP) ................................ 2007-178044

(51) Int. Cl.
*G01C 19/56* (2006.01)
(52) U.S. Cl. ..................................... 73/504.16; 310/329
(58) Field of Classification Search ............... 73/504.12, 73/504.16; 310/329, 330
See application file for complete search history.

(56) References Cited

U.S. PATENT DOCUMENTS

| 5,420,548 A * | 5/1995 | Nakajima ................. 73/504.16 |
| 5,698,929 A | 12/1997 | Seki et al. |
| 5,898,255 A * | 4/1999 | Kishima et al. ............... 310/330 |
| 6,887,205 B2 | 5/2005 | Nakamura et al. |
| 2002/0045829 A1 | 4/2002 | Nakamura et al. |
| 2005/0203403 A1 | 9/2005 | Nakamura et al. |

FOREIGN PATENT DOCUMENTS

| JP | 06-006986 | 1/1994 |
| JP | 06-194176 | 7/1994 |
| JP | 08-035841 | 2/1996 |
| JP | 2002-085361 | 3/2002 |
| JP | 2003-051665 | 2/2003 |
| JP | 2004-251663 | 9/2004 |
| JP | 2007-096899 | 4/2007 |
| JP | 2008-064479 | 3/2008 |

* cited by examiner

*Primary Examiner* — John Chapman, Jr.
(74) *Attorney, Agent, or Firm* — Harness, Dickey & Pierce, P.L.C.

(57) ABSTRACT

A vibration gyro made of a single crystal piezoelectric material includes: a base; a plurality of resonating arms extending from the base; an excitation electrode formed on a surface of at least one of the plurality of resonating arms so as to vibrate at least the one of the plurality of resonating arms; and a piezoelectric element detecting a vibration component due to a Coriolis force acting perpendicularly to a vibrating direction of the plurality of resonating arms being vibrated by the excitation electrode, the piezoelectric element being mounted on a surface of at least one of the plurality of resonating arms and the base.

7 Claims, 4 Drawing Sheets

VIBRATION GYRO

BACKGROUND

1. Technical Field

The present invention relates to a vibration gyro for detecting an angular velocity of a rotating object.

2. Related Art

Vibration gyros are used for camera shake detection in photographic devices, direction detection in car navigation systems, and so on. In recent years, such a demand prevails in various fields, and improvement in performance to detect an angular velocity and downsizing has been required.

Vibration gyros employ a vibration mode in which an excitation mode and a detection mode are at right angles to one another. For example, JP-A-8-35841 discloses a vibration gyro provided with piezoelectric elements for excitation and detection formed on a resonator made of a material generating a mechanical vibration and having a square shape in cross section. The vibration gyro enables the resonator to vibrate largely and to detect an angular velocity with high accuracy by using the piezoelectric elements.

However, the vibration gyro in related art requires large electrical power to excite the resonator by the piezoelectric element for excitation, causing large electricity consumption. Further, the vibration gyro in related art needs to have the piezoelectric elements formed on four faces of the resonator, thereby causing difficulty in a process of mounting the piezoelectric elements associated with miniaturization of the resonator and requiring a large number of man-hours.

SUMMARY

The invention is proposed in order to solve the above-mentioned problems and can be achieved according to the following aspects.

A vibration gyro made of a single crystal piezoelectric material according to an aspect of the invention includes: a base; a plurality of resonating arms extending from the base; an excitation electrode formed on a surface of at least one of the plurality of resonating arms so as to vibrate at least the one of the plurality of resonating arms; and a piezoelectric element detecting a vibration component due to a Coriolis force acting perpendicularly to a vibrating direction of the plurality of resonating arms being vibrated by the excitation electrode. The Coriolis force is generated when the vibration gyro rotate at an angular velocity, The piezoelectric element is mounted on a surface of at least one of the plurality of resonating arms and the base.

In the vibration gyro, a low impedance is obtained by forming the excitation electrode on the resonating arms made of the single crystal piezoelectric material, thereby achieving the vibration gyro operating with low excitation voltage and low consumption power, Further, since the piezoelectric element is only used for detecting an angular velocity, thereby improving accuracy in detecting the angular velocity compared to a case of forming a detection electrode on a single crystal piezoelectric material. Furthermore, the piezoelectric element can be formed only on one of surfaces of the vibration gyro, thereby making a mounting process of the piezoelectric element easy.

In the vibration gyro above, the single crystal piezoelectric material is preferably quartz crystal.

Here, quartz crystal is used as the single crystal piezoelectric material, thereby providing the vibration gyro superior in frequency temperature characteristics with high accuracy in detecting an angular velocity. Further, quartz crystal is easy to form an outline and mount electrodes by photolithography, thereby providing the vibration gyro with excellent mass productivity.

In the vibration gyro above, the piezoelectric element is preferably made of one of a piezoelectric ceramic and a polymer piezoelectric film.

The piezoelectric ceramic and the polymer piezoelectric film are thus employed to the piezoelectric element. Since the piezoelectric ceramic and the polymer piezoelectric film have a larger piezoelectric constant compared to quartz crystal, the vibration gyro having high detection sensitivity for an angular velocity can be provided.

The vibration gyro preferably includes a first metal film formed on a surface of at least one of the plurality of resonating arms and the base, and a second metal film formed on a surface of the piezoelectric element and bonded to the first metal film. The first metal film and the second metal film may be made of a same type of metal film selected from gold, platinum, and palladium.

Since both of the metal films to be bonded are metal films made of the same type of metal selected from gold, platinum, and palladium, the piezoelectric element is easy to be mounted by bonding.

In the vibration gyro as above, at least one metal film surface of the first metal film and the second metal film is preferably formed to be a concave and convex surface so that the first metal film and the second metal film are bonded to each other.

Therefore, the metal films to be bonded are the metal films made of the same type of metal. In addition, since at least one of the surfaces to be bonded has such a concave and convex surface, a convex portion of the surface receives a bonding force, securing bonding of the surfaces even if the bonding force is reduced.

The vibration gyro above preferably includes a bump made of a same type of metal as the first metal film and the second metal film. The bump is formed on at least one metal film surface of the first metal film and the second metal film so that the first metal film and the second metal film are bonded to each other through the bump.

Therefore, the metal films to be bonded are the metal films made of the same type of metal. Then, at least one of the surfaces to be bonded has the bump made of the same type of metal as that of the metal films above and formed thereon. The bump thus receives a bonding force, thereby securing bonding of the surfaces to each other even if the bonding force is reduced.

In the vibration gyro above, the piezoelectric element is preferably bonded by an alloy to a surface of at least one of the plurality of resonating arms and the base.

The resonating arms and the piezoelectric element are thus bonded through the alloy. Such bonding by the alloy can keep a bonding temperature low, achieving bonding without impairing characteristics of the single crystal piezoelectric material and the piezoelectric element. In particular, bonding the resonating arms and the piezoelectric element by a eutectic alloy can keep a bonding temperature low.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

Embodiment

Figure 1:
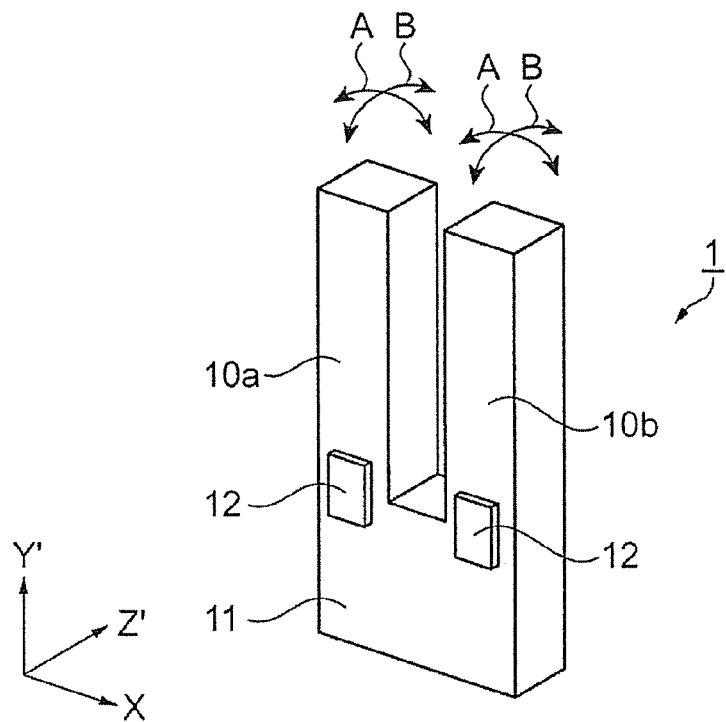
FIG. 1 is a perspective view describing an outline configuration of a tuning-fork vibration gyro according to an embodiment.

FIG. 1 is a perspective view describing an outline configuration of a tuning-fork vibration gyro according to this embodiment.

A tuning-fork vibration gyro 1 is made of a quartz substrate that is a single crystal piezoelectric material etched by photolithography. For the quartz substrate, a quartz substrate having a plane made of an X-axis (electric axis) and a Y-axis (mechanical axis) that are crystal axes, and rotated about the X-axis at a range from 0 to 10 degrees is used. Further, in the embodiment, axes that are newly formed by the rotation about the X-axis are defined as a Y'-axis and a Z' axis.

The tuning-fork vibration gyro 1 is provided with a base 11, two of resonating arms 10a and 10b extending from the base 11 in the Y'-axis direction, and piezoelectric elements 12 respectively mounted on the resonating arms 10a and 10b. The piezoelectric elements 12 should be mounted on portions in which the resonating arms 10a and 13b receive a stress caused by a Coriolis force. In a case of the embodiment, the piezoelectric elements 12 are mounted on portions from the resonating arms 10a and 10b to the base 11. However, the piezoelectric elements 12 can be formed on parts of the resonating arms 10a and 10b only or on the base 11 only. Further, although it is not illustrated, the resonating arms 10a and 10b include excitation electrodes exciting the resonating arms 10a and 10b formed thereon.

The piezoelectric elements 12 are made of piezoelectric ceramics such as lead zirconate titanate. A thin film of lead zirconate titanate in 100 μm thick or less is preferable to be used because such a thin film has a very small mass, providing stable vibration of quartz crystal. Further, a polymer piezoelectric film made of vinylidene fluoride (PVDF), vinylidene fluoride-trifluoroethylene copolymer, or the like can be employed as the piezoelectric elements.

Figure 2:
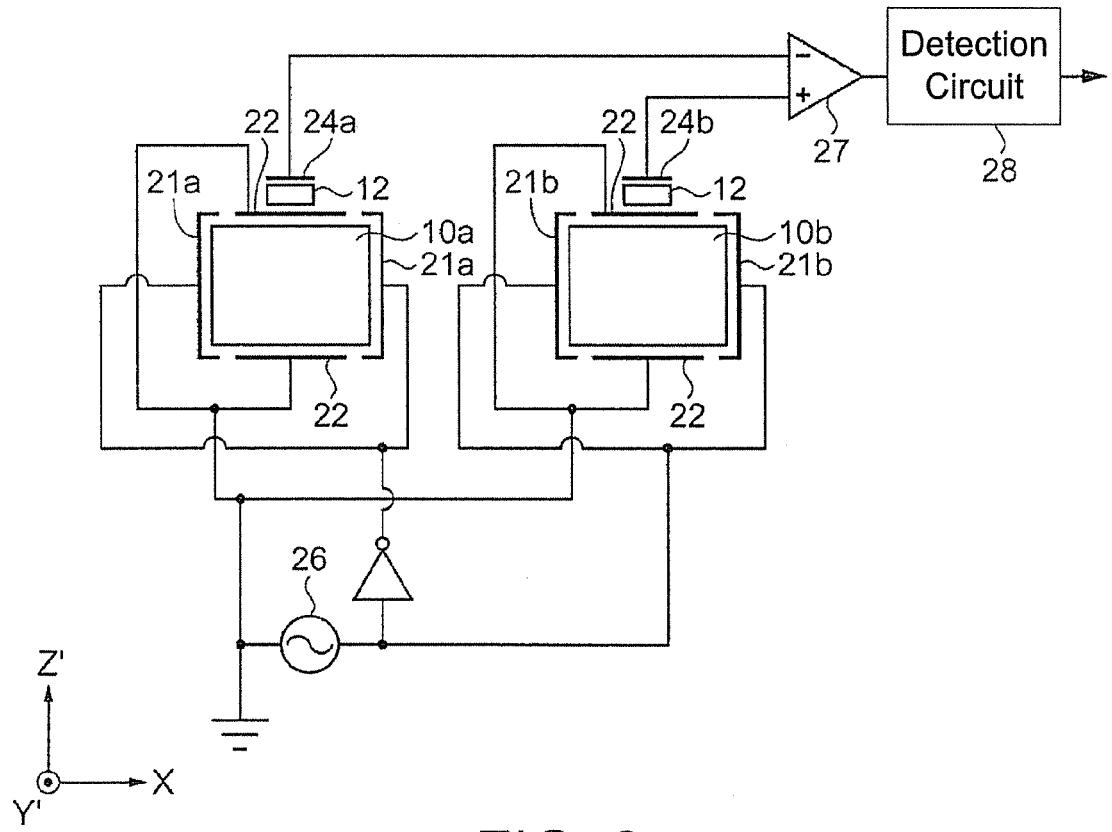
FIG. 2 is a diagram explaining an example of an excitation and detection circuit of the tuning-fork vibration gyro according to the embodiment.

FIG. 2 shows a sectional view of a portion of the resonating arms of the tuning-fork vibration gyro explaining a configuration of electrodes formed on surfaces of the resonating arms and an example of an excitation and detection circuit.

An excitation electrode 21a is formed on surfaces faced each other approximately in parallel to the Z' axis of the resonating arm 10a. Similarly, an excitation electrode 21b is formed on surfaces faced each other approximately in parallel to the Z' axis of the resonating arm 10b. The excitation electrodes 21a and 21b are coupled to an oscillation circuit 26 and arranged to have opposite polarities from each other.

Further, a ground electrode 22 is formed on each of surfaces faced each other approximately in parallel to the X-axis of the resonating arms 10a and 10b, and grounded. The excitation electrodes 21a and 21b, and the ground electrode 22 include a chromium film as a foundation and a gold film on top thereof formed by sputtering, vacuum deposition, or the like.

Then, the piezoelectric elements 12 are respectively mounted on one of the surfaces having the ground electrodes formed thereon and faced each other approximately in parallel to the X-axis of the resonating arms 10a, and on one of the surfaces having the ground electrodes formed thereon and faced each other approximately in parallel to the X-axis of the resonating arms 10b. On two surfaces of the piezoelectric element 12 that are faced each other, a gold film is formed so as to join the gold film of the piezoelectric element 12 and the gold film of the ground electrode 22 by thermocompression bonding.

Further, detection electrodes 24a and 24b formed on surfaces of the piezoelectric elements 12 are coupled to a differential detector 27. Furthermore, the differential detector 27 is coupled to a detection circuit 28.

In the vibration gyro having such a configuration, when a voltage having an opposite polarity is alternately applied from the oscillation circuit 26 to the excitation electrodes 21a and 21b, the resonating arms 10a and 10b perform a flexural vibration in the X-axis direction (a direction of an arrow A in FIG. 1). The flexural vibration repeats vibration (exciting vibration) in a way that ends of the resonating arms 10a and 10b get closer and further.

If a rotation about the Y'-axis is added while the resonating arms 10a and 10b are vibrating, a Coriolis force in a direction perpendicular to the exciting vibration acts on the resonating arms 10a and 10b so as to vibrate (detecting vibration) in the Z'-axis direction (a direction of an arrow B in FIG. 1). At this time, the resonating arms 10a and 10b vibrate in opposite directions from each other. Then, the piezoelectric elements 12 detect a stress receiving from movement of the resonating arms 10a and 10b for detecting vibration. A signal having been detected is differentially amplified by the differential detector 27 and input to the detection circuit 28. The detection circuit 28 obtains an angular velocity signal by processing the detected signal.

Next, a state according to a method for mounting the piezoelectric elements 12 on the resonating arms 10a and 10b will be described.

FIGS. 3A through 3D are schematic views explaining example states of mounting the piezoelectric elements on the resonating arms according to the embodiment.

Figure 3A:
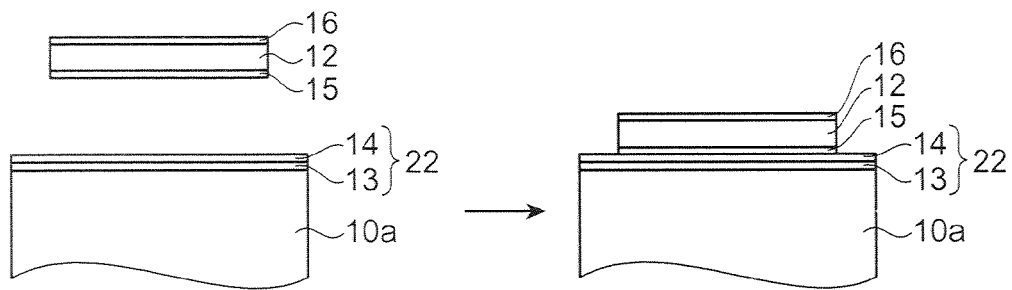
FIGS. 3A through 3D are schematic views explaining states of mounting piezoelectric elements on resonating arms according to the embodiment.

In FIG. 3A, the ground electrode 22 is formed on the surface of the resonating arm 10a. The ground electrode 22 includes a chromium film 13 as a foundation and a gold film 14 on top thereof as a first metal film. Two opposed surfaces of the piezoelectric element 12 have gold films 15 and 16 as second metal films.

Then, both of the gold film 14 of the resonating arm 10a and the gold film 15 of the piezoelectric element 12 are bonded to each other by thermocompression bonding.

Since the gold films 14 and 15 are formed on the surfaces to be bonded, the piezoelectric element 12 is bonded to the resonating arm 10a, making the mounting process easier.

In the descriptions below, parts having the same structure as those in FIG. 3A will be denoted with the same reference numerals and the description thereof will be omitted here.

Figure 3B:
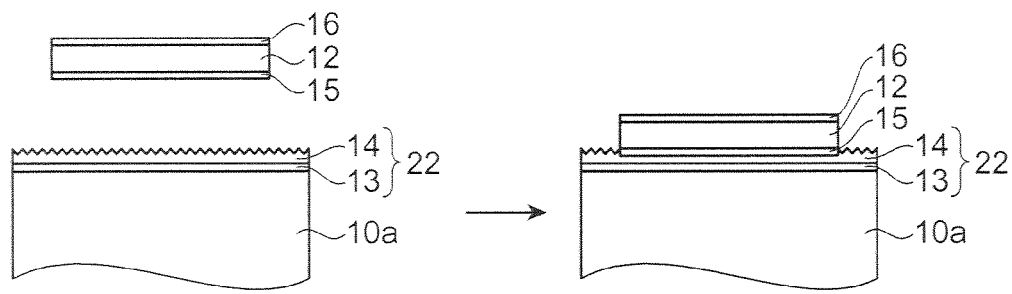

In FIG. 3B, the gold film 14 of the ground electrode 22 formed on the resonating arm 10a is formed to have a concave and convex surface. The concave and convex surface is formed by a nanoimprinting technique, or the like.

Then, both of the gold film 14 of the resonating arm 10a and the gold film 15 of the piezoelectric element 12 are bonded to each other by thermocompression bonding. Such a concave and convex surface can be formed on the gold film 15 on a piezoelectric element 12 side, or can be formed on both of the gold films 14 and 15.

As the above, the metal films of the bonding surfaces of the resonating arm 10a and the piezoelectric element 12 to be bonded to each other are made of the same metal as that of the gold films 14 and 15. In addition, since at least one of the surfaces has such a concave and convex surface, a convex portion of the surface receives a bonding force, securing bonding of the surfaces even if the bonding force is reduced.

Figure 3C:
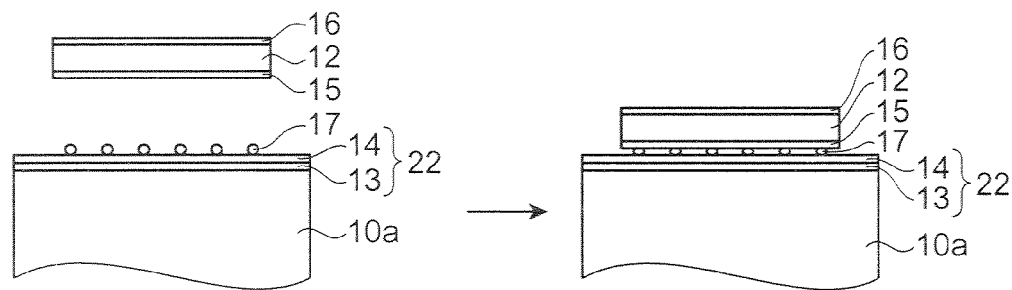

In FIG. 3C, a gold bump 17 is formed on the gold film 14 of the ground electrode 22 formed on the resonating arm 10a.

Then, the resonating arm 10a and the piezoelectric element 12 are bonded to each other by thermocompression bonding through the gold bump 17. Alternatively, such a gold bump to be formed on a surface of the gold film can be formed on the gold film 15 on the piezoelectric element 12 side.

As the above, the metal films of the bonding surfaces of the resonating arm 10a and the piezoelectric element 12 to be bonded to each other are made of the same metal as that of the gold films 14 and 15. Then, at least one of the surfaces to be bonded has a gold bump formed thereon. The bump thus receives a bonding force, thereby securing bonding of the surfaces to each other even if the bonding force is reduced.

Figure 3D:
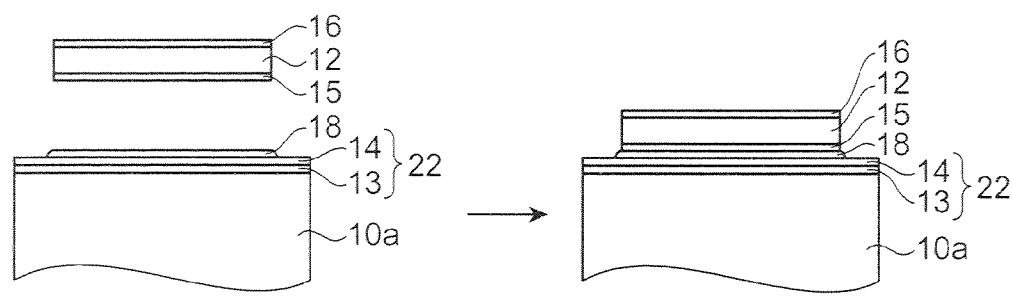

In FIG. 3D, a gold paste 18 composed of submicron gold particles is applied on the surface of the gold film 14 of the ground electrode 22 formed on the resonating arm 10a.

Then, the resonating arm 10a and the piezoelectric element 12 are bonded to each other by thermocompression bonding through the gold paste 18. Alternatively, such a paste to be formed on a surface of the gold film can be formed on the gold film 15 on the piezoelectric element 12 side.

As the above, the metal films of the bonding surfaces of the resonating arm 10a and the piezoelectric element 12 to be bonded to each other are made of the same metal as that of the gold films 14 and 15. Then, at least one of the surfaces to be bonded has the gold paste 18 formed thereon. Accordingly, even if a thickness of the gold film is not sufficiently formed, the thickness can be adjustable with the gold paste 18, thereby securing the bonding of the surfaces.

In the example states of mounting the piezoelectric element 12 on the resonating arm 10a described above using FIGS. 3A through 3D, the bonding surfaces are made to have the same type of metal by employing gold. However, instead of gold, metal such as platinum, or palladium can be used. Further, metal such as gold, platinum, and palladium can be replaced by an alloy including them as a main constituent. Further, in the states above, the piezoelectric element 12 is bonded by heat application. However, it can be bonded by application of ultrasonic waves or ultrasonic waves and heat.

Figure 4:
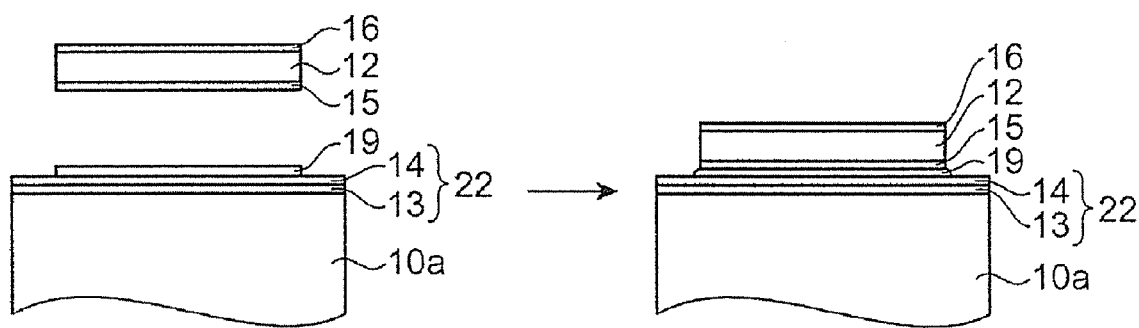
FIG. 4 is a schematic view explaining a state of mounting piezoelectric elements on resonating arms according to the embodiment.

FIG. 4 is a schematic view explaining another example of a state of mounting the piezoelectric element on the resonating arm.

In FIG. 4, the ground electrode 22 is formed on the surface of the resonating arm 10a. The ground electrode 22 includes the chromium film 13 as a foundation and the gold film 14 on top thereof as the first metal film. Then, a solder paste 19 is applied on a portion where the piezoelectric element 12 is to be mounted, on the surface of the gold film 14. The two opposed surfaces of the piezoelectric element 12 have the gold films 15 and 16 as the second metal films.

Then, the piezoelectric element 12 is placed on the solder paste 19 of the resonating arm 10a and heated so as to bond the piezoelectric element 12 to the resonating arm 10a by molten solder. At this time, if an application position of the solder paste is accurately formed, a surface tension acts on the piezoelectric element so as to align in the application position when solder is melted, improving bonding position accuracy.

Such a solder paste to be formed on a gold film can be formed on the gold film 15 on the piezoelectric element 12 side, or can be formed on both the gold films 14 and 15. Alternatively, a solder thin film can be formed instead of the solder paste.

In the embodiment, the resonating arm 10a and the piezoelectric element 12 are thus joined by applying solder that is a eutectic alloy on the bonding surfaces of the resonating arm 10a and the piezoelectric element 12. Such bonding by a eutectic alloy can keep a bonding temperature low, achieving bonding without impairing characteristics of quartz crystal and piezoelectric elements.

Further, other than solder, a eutectic alloy such as a gold-lead alloy, a gold-germanium alloy, or the like can be used. The resonating arm 10a and the piezoelectric element 12 can be bonded by such a eutectic alloy placed between the resonating arm 10a and the piezoelectric element 12 and then heated.

According to the embodiment as above, a low impedance is obtained by forming the excitation electrodes 21a and 21b on the resonating arms 10a and 10b made of quartz crystal, thereby achieving the vibration gyro 1 operating with low excitation voltage and low consumption power.

Further, since the piezoelectric element 12 is only used for detecting an angular velocity, the piezoelectric element 12 can be formed only on one of the surfaces of the vibration gyro 1, thereby making the mounting process of the piezoelectric element 12 easy.

Further, quartz crystal is used as the single crystal piezoelectric material, thereby providing the vibration gyro 1 superior in frequency temperature characteristics with high accuracy in detecting an angular velocity. Furthermore, quartz crystal is easy to form an outline and mount electrodes by photolithography, thereby providing the vibration gyro 1 with excellent mass productivity.

In addition, since a piezoelectric ceramic or a polymer piezoelectric film is used as the piezoelectric element 12, the piezoelectric element 12 has a larger piezoelectric constant compared to quartz crystal. Therefore, the vibration gyro having high detection sensitivity for an angular velocity is provided.

First Modification

A first modification of the embodiment above will be explained next.

Figure 5:
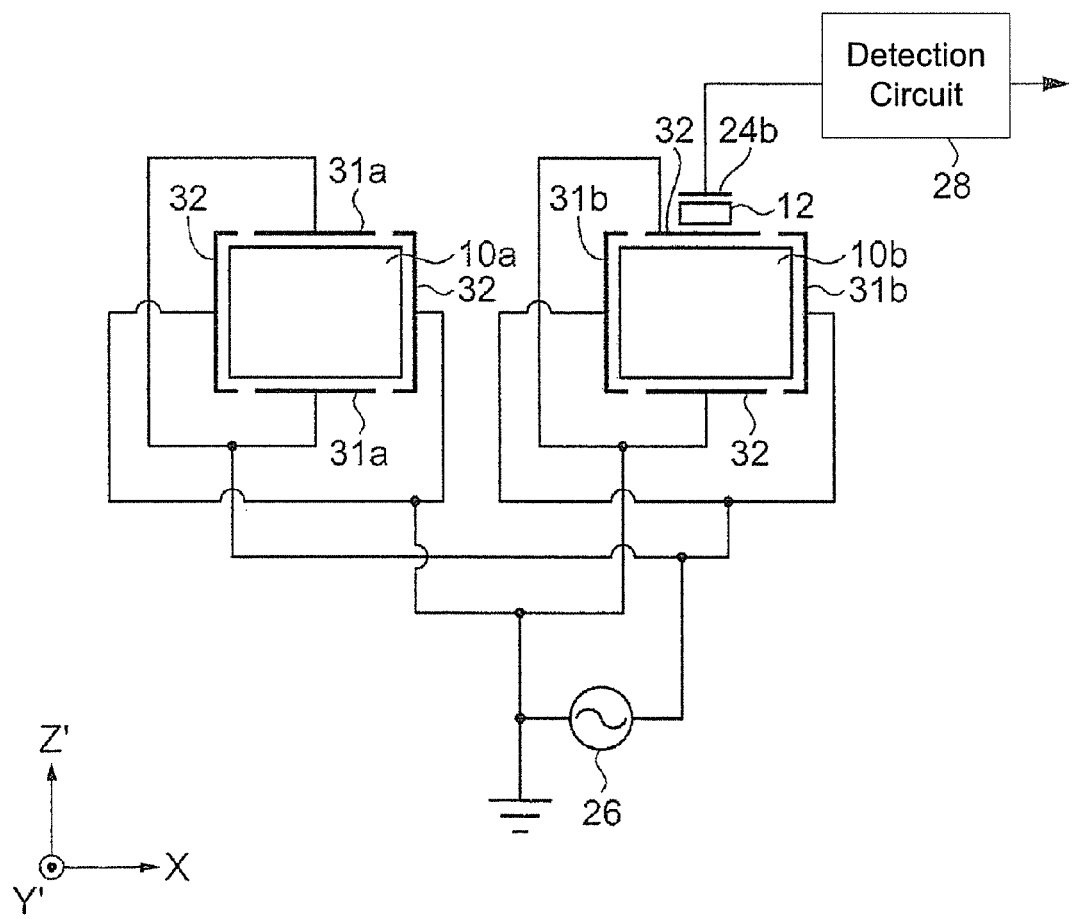
FIG. 5 is a diagram explaining an example of an outline configuration and an excitation and detection circuit of a tuning-fork vibration gyro according to a first modification.

FIG. 5 is a diagram explaining another example of the outline configuration and the excitation and detection circuit of the vibration gyro. The first modification shows an example of a tuning-fork vibration gyro having a piezoelectric element mounted on only one of resonating arms.

An excitation electrode 31a is formed on surfaces faced each other approximately in parallel to the X-axis of the resonating arm 10a. Similarly, an excitation electrode 31b is formed on surfaces faced each other approximately in parallel to the Z'-axis of the resonating arm 10b. The excitation electrodes 31a and 31b are coupled to the oscillation circuit 26.

Further, a ground electrode 32 is formed on each of surfaces faced each other approximately in parallel to the Z'-axis of the resonating arm 10a, and each of surfaces faced each other approximately in parallel to the X-axis of the resonating arm 10b, and grounded. The excitation electrodes 31a and 31b, and the ground electrode 32 include a chromium film as a foundation and a gold film on top thereof formed by sputtering, vacuum deposition, or the like.

Then, the piezoelectric element 12 is mounted on one of the surfaces having the ground electrodes 32 formed thereon and faced each other approximately in parallel to the X-axis of the resonating arm 10b. On the two surfaces of the piezoelectric element 12 that are faced each other, a gold film is formed so as to join the gold film of the piezoelectric element 12 and the gold film of the ground electrode 22 by thermocompression bonding.

Then, the detection electrode 24b formed on the surface of the piezoelectric element 12 is coupled to the detection circuit 28.

In the vibration gyro having such a configuration, when a voltage is applied from the oscillation circuit 26 to the excitation electrodes 31a and 31b alternately, the resonating arms 10a and 10b perform a flexural vibration in the X-axis direction. The flexural vibration repeats vibration (exciting vibration) in a way that ends of the resonating arms 10a and 10b get closer and further.

If a rotation about the Y'-axis is added while the resonating arms 10a and 10b are vibrating, a Coriolis force in a direction perpendicular to the exciting vibration acts on the resonating arms 10a and 10b so as to vibrate (detecting vibration) in the Z'-axis direction. At this time, the resonating arms 10a and 10b vibrate in opposite directions from each other. Then, the piezoelectric element 12 detects a stress receiving from movement of the resonating arm 10b for detecting vibration. A signal having been detected is input to the detection circuit 28. The detection circuit 28 obtains an angular velocity signal by processing the detected signal. Accordingly, the tuning-fork vibration gyro can detect an angular velocity even when having only one of the piezoelectric elements 12.

Second Modification

Now, an enhanced application using a vibration gyro in another shape will be explained as a second modification.

Figure 6:
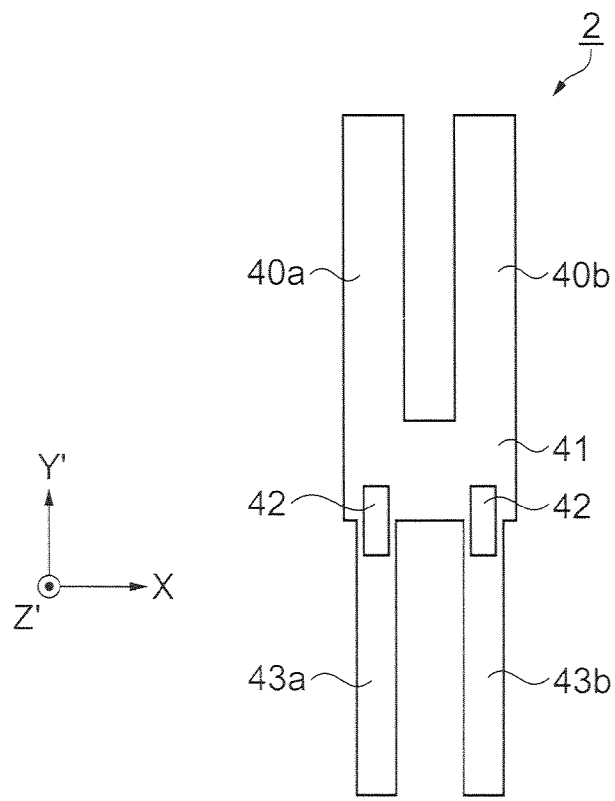
FIG. 6 is a schematic plan view explaining a shape of an H-shaped vibration gyro and a position to mount piezoelectric elements according to a second modification.

FIG. 6 is a schematic plan view explaining a shape of an H-shaped vibration gyro and a position to mount a piezoelectric element according to the second modification.

A shape of an H-shaped vibration gyro 2 is obtained by etching a quartz substrate similarly to the embodiment. The H-shaped vibration gyro 2 includes a base 41, two of resonating arms 40a and 40b for excitation, resonating arms 43a and 43b for detection, and piezoelectric elements 42 made of a piezoelectric ceramic or a polymer piezoelectric film, and formed on the resonating arms 43a and 43b for detection. The resonating arms 40a and 40b extend from the base 41 in the Y'-axis direction, while the resonating arms 43a and 43b extend from the base 41 in the opposite direction from the direction in which the resonating arms 40a and 40b extend from the base 41. The piezoelectric elements 42 are formed two each on the resonating arms.

The resonating arms 40a and 40b for excitation are provided with excitation electrodes (not illustrated) formed thereon. When a voltage is applied to the excitation electrodes, the resonating arms 40a and 40b for excitation perform a flexural vibration in the X-axis direction. Corresponding to the resonating arms 40a and 40b for excitation, the resonating arms 43a and 43b for detection are also excited to vibrate in the X-axis direction for balancing. At this time, if a rotation about the Y'-axis is added, the resonating arms 43a and 43b for detection vibrate in the Z'-axis direction due to a Coriolis force acting on the resonating arms 43a and 43b for detection. The piezoelectric elements 42 detect a stress receiving from movement of the resonating arms 43a and 43b, enabling detection of an angular velocity.

According to the above, the H-shaped vibration gyro also can vibrate the resonating arms 43a and 43b by the excitation electrodes, and allows the piezoelectric elements 42 to detect an angular velocity, thereby providing the same advantageous effects as those of the embodiment described above.

Third Modification

Next, another enhanced application using a vibration gyro in yet another shape will be explained as a third modification.

Figure 7:
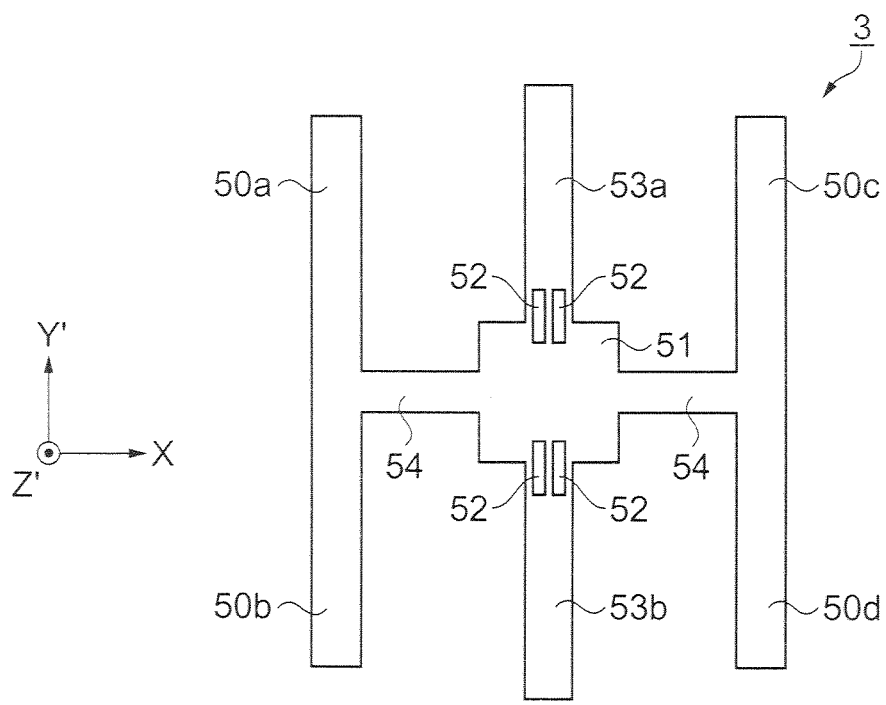
FIG. 7 is a schematic plan view explaining a shape of a WT-shaped vibration gyro and a position to mount piezoelectric elements according to a third modification.

FIG. 7 is a schematic plan view explaining a shape of a WT-shaped vibration gyro and a position to mount piezoelectric elements according to the third modification.

A shape of a WT-shaped vibration gyro 3 is obtained by etching a quartz substrate similarly to the embodiment. The WT-shaped vibration gyro 3 includes a base 51, two of resonating arms 53a and 53b for detection extending from the base 51 in the Y-axis direction, two connecting arms 54 extending from the base 51 in the X-axis direction, resonating arms 50a, 50b, 50c, and 50d for excitation extending from ends of the connecting arms 54 in the Y'-axis direction, and piezoelectric elements 52 made of a piezoelectric ceramic or a polymer piezoelectric film, and respectively formed on the resonating arms 53a and 53b for detection.

The resonating arms 50a, 50b, 50c, and 50d for excitation are provided with excitation electrodes (not illustrated) formed thereon. When a voltage is applied to the excitation electrodes, the resonating arms 50a, 50b, 50c, and 50d perform a flexural vibration in the X-axis direction. At this time, the resonating arms 53a and 53b for detection do not vibrate. Here, if a rotation about the Y'-axis is added to the WT-shaped vibration gyro 3, the resonating arms 50a, 50b, 50c, and 50d for excitation vibrate in the Z'-axis direction due to a Coriolis force acting on the resonating arms 50a, 50b, 50c, and 50d. Corresponding to the vibration, the resonating arms 53a and 53b for detection vibrate in Z'-axis direction. Then, the piezoelectric elements 52 detect a stress receiving from movement of the resonating arms 53a and 53b, *enabling detection of an angular velocity.*

Accordingly, the WT-shaped vibration gyro 3 also can vibrate the resonating arms 50a, 50b, 50c, and 50d for excitation by the excitation electrodes, and allows the piezoelectric elements 52 mounted on the resonating arms 53a and 53b for detection to detect an angular velocity. The third modification can thus provide the same advantageous effects as those of the embodiment described above.

In the embodiment, quartz crystal is used as the single crystal piezoelectric material. However, lithium tantalite, lithium niobate, lithium borate, langasite, or the like is also applicable.

The entire disclosure of Japanese Patent Application No. 2007-178044, filed Jul. 6, 2007 is expressly incorporated by reference herein.

What is claimed is:

1. A vibration gyro made of a single crystal piezoelectric material, comprising:
   a base;
   a plurality of resonating arms extending from the base;

an excitation electrode formed on a surface of at least one of the plurality of resonating arms so as to vibrate at least the one of the plurality of resonating arms;

a piezoelectric element detecting a vibration component due to a Coriolis force acting perpendicularly to a vibrating direction of the plurality of resonating arms being vibrated by the excitation electrode, the Coriolis force is generated when the vibration gyro rotate at an angular velocity, the piezoelectric element being mounted on a surface of both the base and at least one of the plurality of resonating arms;

a first metal film formed on a surface of both the base and at least one of the plurality of resonating arms; and a second metal film formed on a surface of the piezoelectric element, wherein at least one metal film surface of the first metal film and the second metal film is formed to be a concave and convex surface so that the first metal film and the second metal film are directly bonded to each other.

2. The vibration gyro according to claim 1, wherein the single crystal piezoelectric material is quartz crystal.

3. The vibration gyro according to claim 1, wherein the piezoelectric element is made of a piezoelectric ceramic or a polymer piezoelectric film.

4. The vibration gyro according to claim 1, wherein
the first metal film and the second metal film are made of a same type of metal film selected from gold, platinum, and palladium.

5. The vibration gyro according to claim 4, further comprising, a bump made of a same type of metal as the first metal film and the second metal film, the bump being formed on at least one metal film surface of the first metal film and the second metal film so that the first metal film and the second metal film are bonded to each other through the bump.

6. The vibration gyro according to claim 1, wherein the piezoelectric element is bonded by an alloy to the surface of both the base and at least one of the plurality of resonating arms.

7. The vibration gyro according to claim 1, wherein the concave and convex surface is formed by a nanoimprinting technique.

* * * * *